US006181270B1

(12) United States Patent
Dwyer

(10) Patent No.: US 6,181,270 B1
(45) Date of Patent: Jan. 30, 2001

(54) REFERENCE-BASED AUTOFOCUSING METHOD FOR IFSAR AND OTHER APPLICATIONS

(75) Inventor: J. Craig Dwyer, Ann Arbor, MI (US)

(73) Assignee: Veridian ERIM International, Inc., Ann Arbor, MI (US)

( * ) Notice: Under 35 U.S.C. 154(b), the term of this patent shall be extended for 0 days.

(21) Appl. No.: 09/510,561

(22) Filed: Feb. 22, 2000

Related U.S. Application Data

(60) Provisional application No. 60/121,263, filed on Feb. 23, 1999.

(51) Int. Cl.[7] .................................................. G01S 13/90
(52) U.S. Cl. ............................ 342/25; 342/174; 342/189; 342/196
(58) Field of Search ................................. 342/25, 91, 98, 342/102, 159, 162, 173, 174, 189, 194, 195, 196

(56) References Cited

U.S. PATENT DOCUMENTS

| | | | |
|---|---|---|---|
| 4,786,906 | * | 11/1988 | Krogager ............................... 342/25 |
| 4,924,229 | * | 5/1990 | Eichel et al. ........................... 342/25 |
| 5,248,976 | * | 9/1993 | Hiho et al. ............................. 342/25 |
| 5,327,140 | * | 7/1994 | Buckreuss ............................. 342/25 |
| 5,343,204 | * | 8/1994 | Farmer et al. ......................... 342/25 |
| 5,608,404 | * | 3/1997 | Burns ..................................... 342/25 |
| 5,952,955 | * | 7/1999 | Kennedy et al. ...................... 342/25 |

OTHER PUBLICATIONS

J. Auterman, "Phase Stability Requirements for a Bistatic SAR," Proceedings of the IEEE National Radar Conference, Mar. 13–14, 1984.

* cited by examiner

*Primary Examiner*—John B. Sotomayor
(74) *Attorney, Agent, or Firm*—Gifford, Krass, Groh, Sprinkle, Anderson & Citkowski, PC

(57) ABSTRACT

A reference-based autofocusing procedure is particularly suited to existing and future interferometric SAR systems, though the principles are generally applicable to signal processing systems for which there are two partially correlated data sets having relative spectral errors. In an airborne or spaceborne system, the technique only requires some additional steps in the ground processor functions. The invention takes advantage of the fact that in a bistatic system, one antenna phase center both transmits and receives with the usual common-mode cancellation, and can thus be expected to form a reasonably well-focused image. In the second system, with the degraded phase error response, the image provided by the first system is used as a coherent reference to aid the estimation and removal of the relative phase errors between the two. Thus, the methodology uses the initially degraded image pair correlation data to help estimate and remove errors in a way which naturally maximizes the final correlation level obtained. The data may represent an entire image, or a selected subregion or subregions of the whole image to be operated upon.

9 Claims, 4 Drawing Sheets

Steps 1–5: Compensation Signal Generation

Steps 1-5: Compensation Signal Generation

Steps 6-9: Compensation Application

Steps 1-5: Compensation Signal Generation

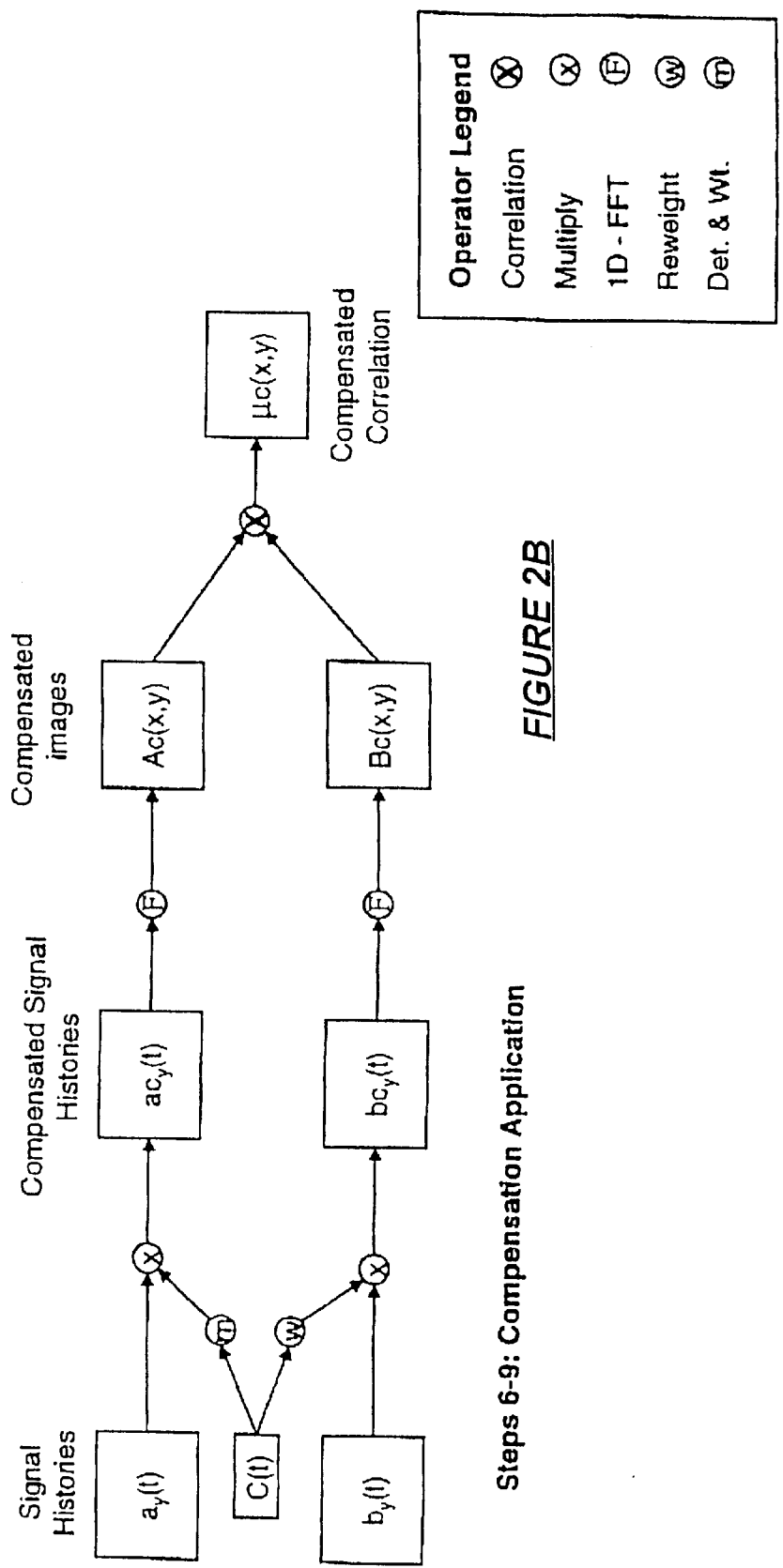

REFERENCE-BASED AUTOFOCUSING METHOD FOR IFSAR AND OTHER APPLICATIONS

REFERENCE TO RELATED APPLICATIONS

This application claims priority from U.S. provisional patent application Ser. No. 60/121,263, filed Feb. 23, 1999, the entire contents of which are incorporated herein by reference.

FIELD OF THE INVENTION

This invention related generally to signal processing and, in particular, to the removal of phase error in an uncompensated dataset, including datasets representative of synthetic aperture radar (SAR) images.

BACKGROUND OF THE INVENTION

In signal-processing systems having two partially correlated data sets with relative spectral errors, phase-related problems may arise. Such is the case with interferometric synthetic aperture radar (IFSAR) systems operating in a bistatic mode. In a bistatic configuration, only one antenna of a pair transmits, but both antennas receive simultaneously. This is in contrast to monostatic IFSAR operation, wherein both antennas transmit and receive essentially independently on alternate pulses. In a monostatic mode, the same local oscillator (LO) is used for both the transmit and receive functions. As such, the LO phase noise which degrades the SAR output is the result of a first difference operation on the phase noise with a time offset equal to the roundtrip range delay. This provides significant cancellation for the low-frequency components of the LO phase noise (common-mode cancellation).

In a bistatic mode of operation, however, the transmit and receive functions may use independent local oscillators. Accordingly, there is no phase noise cancellation in the bistatic channel of such an interferometric system. In fact, the two noise sources add, and the phase noise requirements on both LOs are much more severe. (see, for example, J. Autennan, "Phase Stability Requirements for a Bistatic SAR", Proceedings of the IEEE National Radar Conference, March 1994).

These LO errors become phase errors in the demodulated SAR data. These, in turn, contribute to a loss of resolution, high sidelobes and smearing of the image data. In an IFSAR system, LO errors also cause loss of correlation in the interferometer comparison. The phase information contained in the IFSAR correlation is normally converted to elevation map data via several additional processing steps. Due to the loss of correlation, however, the phase will be noisy, and the elevation data accuracy will also be degraded.

In a bistatic mode of operation, extreme stability or some other compensation technique is required to mitigate IFSAR bistatic phase errors. In terms of stability, one approach is to use high-quality atomic clocks; another approach is to actively lock the two oscillators together. These solutions could have potentially significant cost impact, particularly in a spaceborne system. With high-quality oscillators, the problems with bistatic operation typically causes low-frequency phase errors and high-azimuth sidelobes in the bistatic image channel for modest aperture times (i.e., several seconds). Autofocus approaches, both quadratic and higher-order, can help to alleviate this problem, but the degree of compensation is only partial, and still requires high-quality clock stability. In addition, this technique may not be reliable in all terrain clutter environments.

SUMMARY OF THE INVENTION

The present invention improves upon the prior art by providing phase-correction procedures that may be implemented without the need for specialized spaceborne hardware. The technique, generally referred to as reference-based autofocusing, or RBA, is particularly suited to existing and future interferometric SAR systems, though the principles are generally applicable to signal processing systems for which there are two partially correlated data sets having relative spectral errors. In an airbourne SAR system, the technique only requires some additional steps in the ground processor functions.

Broadly, the invention takes advantage of the fact that in a bistatic system, one antenna phase center both transmits and receives with the usual common-mode cancellation, and can thus be expected to form a reasonably well-focused image. In the second system, with the degraded phase error response, the image provided by the first system is used as a coherent reference to aid the estimation and removal of the relative phase errors between the two. Thus, the methodology uses the initially degraded image pair correlation data to help estimate and remove errors in a way which naturally maximizes the final correlation level obtained.

In an interferometric synthetic aperture radar (IFSAR) system producing complex images, $A(x,y)$ and $B(x,y)$, where A represents a monostatic image and B is a degraded bistatic image having an initial phase error, and where $(x,y)$ are azimuth and range sample coordinates, respectively, a preferred method of reducing phase error would include the following important steps:

performing a normalized, complex, cross-correlation operation on A and B to obtain a result, $\mu(x,y)$;

multiplying $\mu$ and B on a pixel-by-pixel basis to obtain a result, $B'(x,y)$;

performing one-dimensional FFT on A and B' in the azimuth dimension to obtain $a_y(t)$ and $b_y'(t)$;

performing a complex, cross-correlation operation on $a_y(t)$ and $b_y'(t)$, on a sample-by-sample basis, and normalizing the result to obtain a phase-error correction signal, $\exp(j\phi(t))$;

performing a one-dimensional FFT on B to obtain $b_y(t)$;

complex multiplying $b_y(t)$ with $\exp(j\phi(t))$ on a line-by-line basis to obtain a complex compensation signal, $bc_y(t)$;

performing a one-dimensional FFT on $bc_y(t)$ to obtain a compensated image, $Bc(x,y)$; and cross-correllating A and Bc to obtain a compensated correlation image, $\mu c(x,y)$.

A and B may represent an entire image, or a selected subregion or subregions of the whole image, in which case the regions are preferably significantly larger in the azimuth dimension than the amount of smearing expected from the phase errors. The subregions are also preferably selected to contain statistically significant amounts of the best correlated data. The correlation magnitude or various possible linear or non-linear thresholded values of this correlation magnitude may also be used to automatically select the subregions of the whole image to be used. The correlation levels observed are typically a positively biased statistical distribution, in that the actual correlation of the underlying complex data is less than the average correlation level measured. This bias may be estimated by various methods and removed. The corrected correlation values may then be thresholded at some minimum value, and in minimum size blocks of pixels, to determine adjusted weights, $w(x,y)$ and m(x,y), for the subsequent compensation steps according to an alternative embodiment.

BRIEF DESCRIPTION OF THE DRAWINGS

FIG. 2B is a flow diagram associated with the application of the compensation signal of FIG. 2A.

DETAILED DESCRIPTION OF THE INVENTION

This invention provides a method of compensating phase errors in interferometric synthetic aperture radar (SAR) processing systems. As discussed above, the invention is not limited in this regard, and is generally applicable to signal-processing systems having two partially correlated data sets with relative spectral error.

Broadly, the invention takes advantage of the fact that in a bistatic system, one antenna phase center both transmits and receives with the usual common-mode cancellation, and can thus be expected to form a reasonably well-focused image. In the second system, with the degraded phase error response, the image provided by the first system is used as a coherent reference to aid the estimation and removal of the relative phase errors between the two. The methodology uses the initially degraded image pair correlation data to help estimate and remove errors in a way which naturally maximizes the final correlation level obtained.

In a certain airbourne IFSAR application having both belly and wing tip mounted radar antennas, the method is advantageously applied to poorly compensated motion errors associated with the wing channel. Whereas the belly channel generally exhibits acceptable motion compensation, the wing channel has less effective motion compensation procedures due to a variety of problems. As a consequence, wing channel motion compensation is difficult to apply, and not fully tested or reliable in its current operation. For large baseline space-based IFSAR systems, such as that envisioned for Discoverer 11, or any IFSAR systems having two separate receivers and independent local oscillators, there are similar phase error problems when operating in a bistatic mode.

Figure 1A:
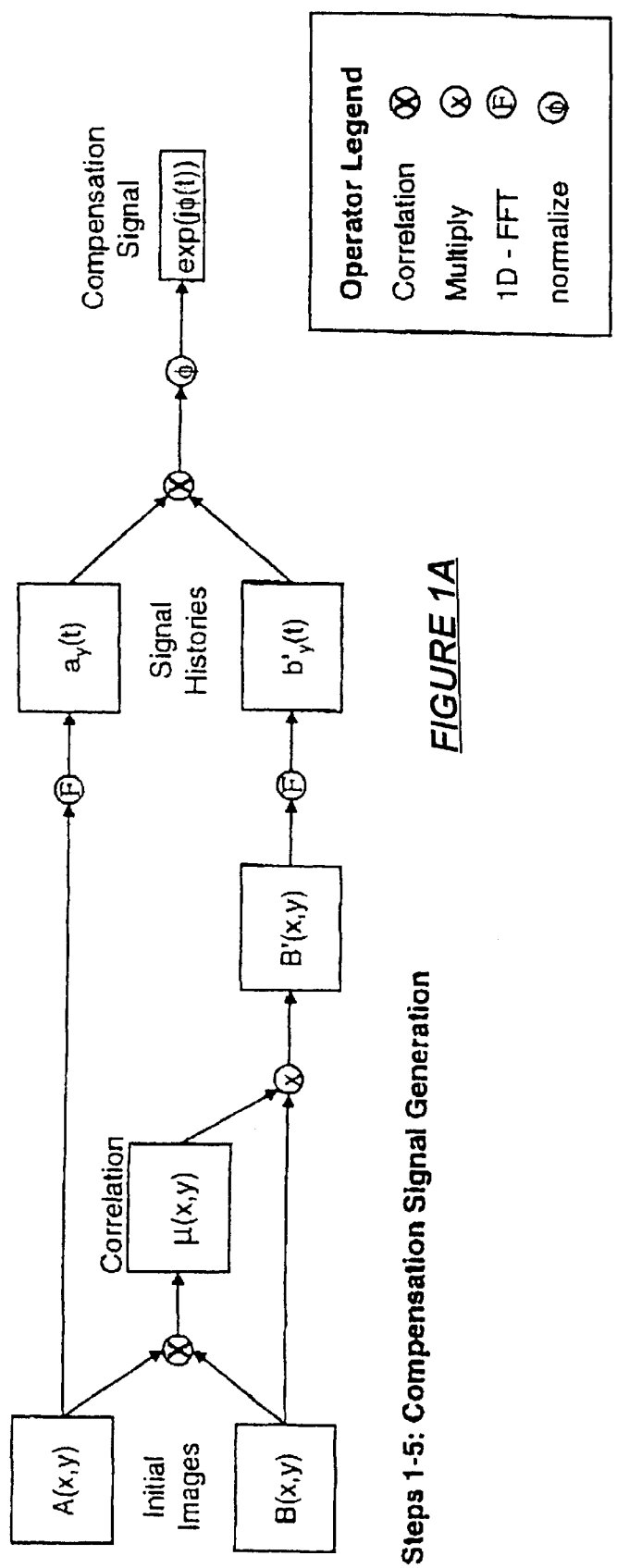
FIG. 1A is a flow diagram associated with the development of a compensation signal according to a preferred embodiment of the invention.
Figure 1B:
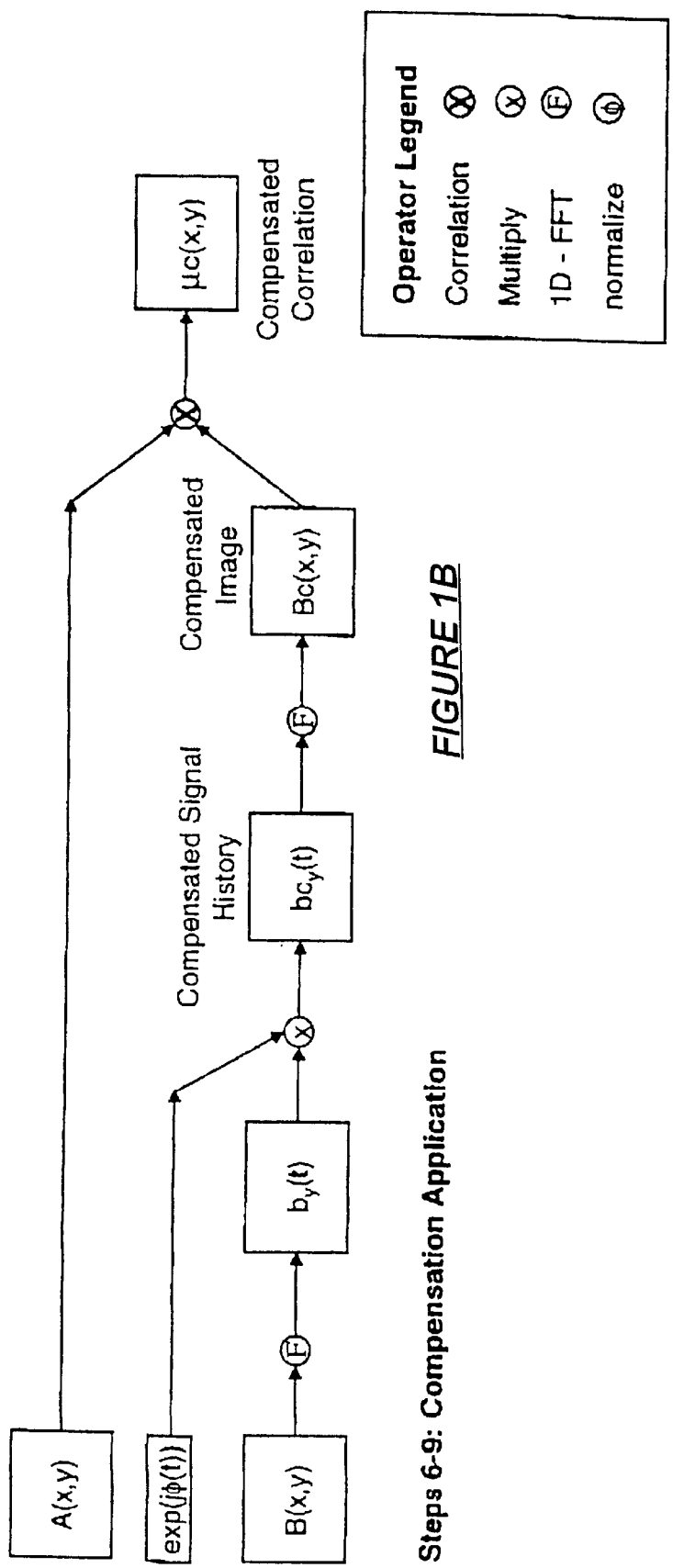
FIG. 1B is a flow diagram associated with the application of the compensation signal of FIG. 1A.

The processing steps for the basic procedure are summarized in FIGS. 1A and 1B. FIG. 1A shows the steps associated with the generation of a ompensation signal, whereas FIG. 1B illustrate the actual compensation application. In this description, A(x,y) and B(x.y) represent complex SAR images from the two channels of the IFSAR system, where (x,y) are the azimuth and range sample coordinates respectively. A and B are envisioned as representing terrain clutter images. These are termed complex images, since each image sample has independent "in-phase" and "quadrature" components, or equivalently, real and imaginary, or magnitude and phase components.

Image A represents the higher-quality, monostatic image, which will serve as the coherent reference, while image B is the degraded bistatic mode image with initial phase errors. It is assumed here that A and B have gone through some of the initial stages of a standard interferometric comparison;

i.e. that B has been warped and resampled into precise registration with image A.

For simplicity in the description of the processing steps below, A and B are envisioned to be the entire processed images. However, to reduce the computational burden, A and B may be selected subregions of the images with suitable and straightforward adjustments to subsequent phase error compensation operations. This is discussed in more detail below. The processing steps are as follows:

1. A normalized complex cross-correlation operation is performed on A and B. This step also is a standard processing operation for an IFSAR system.

$$\mu(x,y)=[1/D(x,y)]\Sigma[A(x,y)B^*(x,y)]$$

where $$D(x,y)=\{\{\Sigma|A(x,y)|^2\}\{\Sigma|B(x,y)|^2\}\}^{1/2}$$

B* represents the complex conjugate of B. The indicated summation is a spatial sum of several pixels in a local neighborhood of (x,y). The denominator, D normalizes the correlation to a maximum amplitude of 1.00. The output of this operation is a complex valued correlation function or image, sometimes called the interferogram.

2. The correlation is complex multiplied, pixel-for-pixel, with image B, yielding B'. This weights areas of image B according to their signal-to-noise ratio, and/or any other factors which affect the correlation level, and also normalizes the phase of image B relative to image A.

3. An inverse FFT is taken in the azimuth dimension to reconstruct the signal-history time samples for each range line of both images A and B'.

4. The resulting signal history vectors are complex cross-correlated, i.e. $b_y'(t)$ is complex-conjugated, multiplied sample-for-sample with $a_y(t)$, and averaged over several samples. Typically, all range samples are summed or averaged, and some neighborhood of the time samples might also be averaged if it is expected that the phase errors are slowly varying.

5. The resulting signal history correlation is normalized to unity amplitude to yield the phase-error correction signal, $\exp(j\phi(t))$.

6. The initial range compressed but azimuth degraded signal history data, $b_y(t)$, is reconstructed by one-dimensional FFTof B.*

7. The degraded signal history is complex-multiplied line-by-line with the complex compensation signal, $\exp(j\phi(t))$ to accomplish the phase-error correction, *

* Alternatively, the initial, fully uncompressed signal history may be compensated by a suitably resampled compensation signal, and the compensated image reconstructed by the usual two-dimensional FFT.

8. The compensated or corrected image, Bc(x,y), is reconstructed with an FFT.

9. A compensated correlation image, $\mu c(x,y)$, is formed, having higher correlation level.

The remainder of the usual IFSAR elevation extraction operations could then proceed from the improved correlation image product. If A and B are a selected subregion or subregions of the whole image, the regions should be significantly larger in the azimuth dimension than the amount of smearing expected from the phase errors, and they should be selected to contain statistically significant amounts of the best correlated data.

The correlation magnitude or various possible linear or non-linear thresholded values of this correlation magnitude can be used to automatically select the subregions of the whole image to be used. The correlation levels observed are typically a positively biased statistical distribution; i.e. the actual correlation of the underlying complex data is less than the average correlation level measured. This bias can be estimated by various methods and removed. The corrected correlation values may then be thresholded at some minimum value, and in minimum size blocks of pixels, to determine adjusted weights, w(x,y) and m(x,y), for the subsequent compensation steps.

Figure 2A:
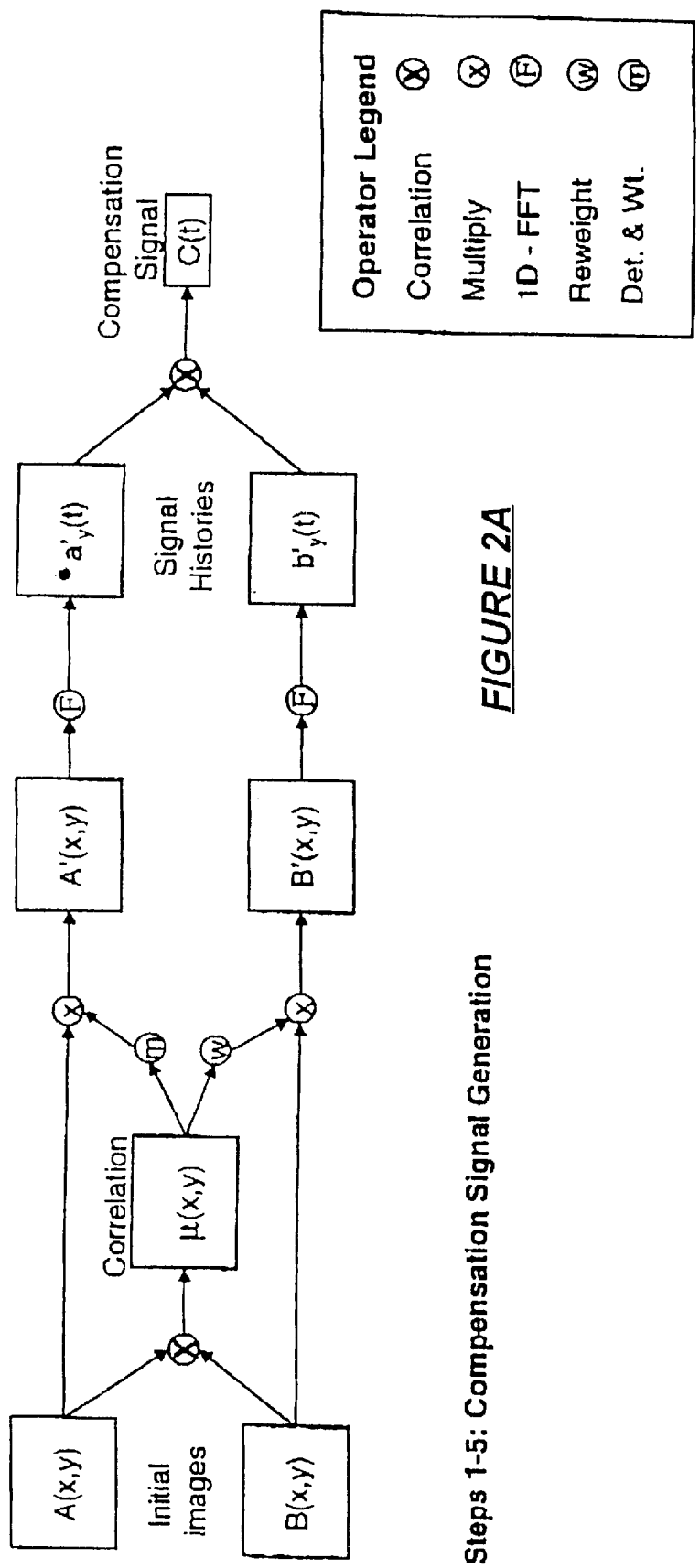
FIG. 2A is a flow diagram associated with the development of a compensation signal according to an alternative embodiment of the invention.

These modified or generalized procedures are illustrated in FIGS. 2A and 2B. Reweighting of both the reference and bistatic images can be performed. Normally, only the amplitude of the reference image will be adjusted, not its phase. Thus, the operator 'm' is used to indicate a magnitude detection, amplitude adjustments and thresholding like those described in the paragraph above. The 'w' operator, on the other hand, remains complex valued with adjusted magnitudes. These generalized amplitude weights can be used in both the image and phase history domains. If there is significant lack of overlap in the phase history data, or the average terrain is tilted, this generalized procedure can automatically trim off or deweight the non-overlapping data.

In summary, the described procedures represent a much more reliable and nearly error-free solution. In tests on simulated and actual data, the method has been shown to remove large amounts of low and high frequency phase errors, in the presence of noise and with a residual error of less than 2 degrees rms. This accuracy reduces correlation losses to a negligible amount in all realistic cases. The same process may also be used to eliminate other sources of relative phase errors, such as differential ionospheric turbulence or motion compensation errors. Note that only the relative difference in the phase errors between the two images degrades the correlation level, phase errors which are common to both will not cause loss of correlation, at least to a first order of approximation.

I claim:

1. A method of reducing phase error with respect to partially correlated datasets, comprising the steps of:
   receiving a monostatic dataset A;
   receiving a bistatic dataset B having phase error;
   cross-correlating A and B to obtain a result, $\mu$;
   using $\mu$ to generate a compensation signal; and
   applying the compensation signal at least to B to remove the phase error.

2. The method of claim 1, wherein the datasets represent synthetic aperture radar (SAR) images.

3. The method of claim 2, wherein the SAR images are interferometric SAR images.

4. The method of claim 3, further including the steps of:
   multiplying $\mu$ with B to obtain B';
   performing FFTs on A and B' to obtain signal histories; and
   correlating the signal histories to generate the compensation signal.

5. The method of claim 4, wherein the step of applying the compensation signal further includes the steps of:
   performing an FFT on B to obtain an uncompensated signal history, b;
   multiplying the compensation signal with b to obtain a compensated signal history;
   performing an FFT on the compensated signal history to obtain a compensated image; and
   correlating A with the compensated image to obtain a compensated correlation.

6. The method of claim 3, further including the steps of:
   performing a magnitude detection and weighting of $\mu$, and multiplying the result with A to obtain A';
   performing a reweighting of $\mu$, and multiplying the result with B to obtain B';
   performing FFTs on A' and B' to obtain signal histories; and
   correlating the signal histories to generate the compensation signal, C.

7. The method of claim 6, wherein the step of applying the compensation signal further includes the steps of:
   performing FFTs on A and B to obtain signal histories, a and b;
   performing a magnitude detection and weighting of C, and multiplying the result with a to obtain a compensated signal history for a;
   performing a reweighting of C, and multiplying the result with b to obtain a compensated signal history for b;
   performing FFTs on the compensated signal histories for a and b to obtain compensated images; and
   correlating the compensated images to obtain a compensated correlation.

8. A method of reducing phase error in interferometric synthetic aperture radar (IFSAR) images, comprising the steps of:
   receiving complex SAR images, A(x,y) and B(x,y), where A represents a monostatic image and B is a degraded bistatic image having an initial phase error, and (x,y) are azimuth and range sample coordinates, respectively;
   performing a normalized, complex, cross-correlation operation on A and B to obtain a result, $\mu(x,y)$;
   multiplying $\mu$ and B on a pixel-by-pixel basis to obtain a result, B'(x,y);
   performing one-dimensional FFT on A and B' in the azimuth dimension to obtain $a_y(t)$ and $b_y'(t)$;
   performing a complex, cross-correlation operation on $a_y(t)$ and $b_y'(t)$, on a sample-by-sample basis, and normalizing the result to obtain a phase-error correction signal, $\exp(j\phi(t))$;
   performing a one-dimensional FFT on B to obtain $b_y(t)$;
   complex multiplying $b_y(t)$ with $\exp(j\phi(t))$ on a line-by-line basis to obtain a complex compensation signal, $bc_y(t)$;
   performing a one-dimensional FFT on $bc_y(t)$ to obtain a compensated image, Bc(x,y); and
   cross-correllating A and Bc to obtain a compensated correlation image, $\mu c(x,y)$.

9. The method of claim 8, wherein A and B are subsets of a larger image.

* * * * *